United States Patent [19]
Dunning et al.

[11] Patent Number: 5,482,409
[45] Date of Patent: Jan. 9, 1996

[54] PART POSITIONING AND DRILLING END EFFECTOR

[75] Inventors: Zenna J. Dunning, Spanaway; Paul E. Nelson; Hinrich C. Patjens, both of Tacoma; James A. Shofner, Auburn; David A. Yousko, Renton, all of Wash.

[73] Assignee: The Boeing Company, Seattle, Wash.

[21] Appl. No.: 2,364

[22] Filed: Jan. 6, 1993

[51] Int. Cl.⁶ .......................... B23B 35/00; B23B 41/00
[52] U.S. Cl. .......................... 408/1 R; 408/46; 408/52; 408/53; 408/103
[58] Field of Search ...................... 408/1 R, 46, 51, 408/52, 42, 53, 88, 103, 95

[56] References Cited

U.S. PATENT DOCUMENTS

| | | | |
|---|---|---|---|
| 1,296,470 | 3/1919 | Bovard. | |
| 2,592,432 | 4/1952 | Kline et al. | |
| 2,824,470 | 2/1958 | Groves | 408/103 |
| 3,154,338 | 10/1964 | Leach | 294/88 |
| 3,507,025 | 4/1970 | Ankeney | 408/52 |
| 3,749,507 | 7/1973 | Haley | 408/46 |
| 4,598,453 | 7/1986 | Wills | 29/271 |
| 4,613,262 | 9/1986 | Woods | 409/211 |
| 4,678,378 | 7/1987 | Koczarski | 408/46 |
| 4,858,334 | 8/1989 | Heitzmann | 33/673 |
| 4,948,308 | 8/1990 | Giannuzzi et al. | 408/103 |
| 5,088,171 | 2/1992 | Suzuki | 29/34 B |
| 5,127,139 | 7/1992 | McCowin et al. | 408/37 |

FOREIGN PATENT DOCUMENTS

| | | |
|---|---|---|
| 1363431 | 5/1963 | France. |
| 60-249519 | 10/1985 | Japan. |
| 103485 | 10/1922 | Switzerland. |
| 1196261 | 7/1985 | U.S.S.R. |
| 1252164 | 8/1986 | U.S.S.R. |
| 12279 | of 1910 | United Kingdom. |

Primary Examiner—Daniel W. Howell
Attorney, Agent, or Firm—J. Michael Neary

[57] ABSTRACT

An end effector adapted for attachment to and accurate positioning by a robot is provided for positioning a right angle shaped workpiece at a desired position against a panel and drilling a pair of accurately located positioning holes through the workpiece and the panel. The end effector includes a rear plate having a conventional tool connector and adapter that can be grasped and manipulated by the robot. A frame is cantilevered on the rear plate and supports a shuttle mounted on horizontal linear bearings for lateral motion of the shuttle. A pair of vertical bearings on the shuttle supports two horizontal support plates for vertical motion on the shuttle. A drill and an inserter are mounted on the support plates for lateral motion with the shuttle, and for vertical motion on the shuttle. Two servomotors under control of a system controller control the lateral motion of the shuttle and the vertical motion of the support plates, and a linear motion encoder provides feedback to the controller to attain accurate positioning of the support plates and the drills mounted thereon.

17 Claims, 13 Drawing Sheets

PART POSITIONING AND DRILLING END EFFECTOR

This invention relates to end effectors, manipulated by robots or NC machine tools, for positioning and drilling a workpiece, and more particularly to an end effector for grasping and positioning a right-angle shaped workpiece such as a shear tie against a panel on which the workpiece is to be fastened and in line with a pair of drills in the end effector for precisely accurate positioning of the workpiece on the panel and drilling accurate positioning holes in the workpiece and the panel.

BACKGROUND OF THE INVENTION

A need has developed in industry for an end effector that can be picked up and manipulated by a robot and used to grasp a workpiece and position that workpiece at a precisely predetermined position against a panel, and then drill a pair of coordination holes through the workpiece and the panel that can be used for precisely locating the workpiece on the panel. An end effector with this capability would be useful in many traditional manufacturing applications, but finds especially significant value in a new manufacturing technique known as "virtual tooling assembly," which is disclosed and claimed in a concurrently filed patent application Ser. No. 07/964,533 entitled "PANEL AND FUSELAGE ASSEMBLY."

In traditional manufacturing, parts are normally held in tooling fixtures and assembly jigs to accurately locate the parts by butting their edges against hard stops on the tooling. From those stops, locations on the part are determined for holes, fasteners, and other manufacturing processes which are performed on the part. Assuming that the part is located properly on the tooling and that the drill guides and other parts of the tooling for performing the manufacturing processes have been accurately located, the part will be accurately manufactured. However, in the real-life environment of a factory, the tooling receives some heavy and sometimes abusive use and the accuracy of the stops, drill guides, and other elements of the tooling frequently become worn, damaged, or otherwise out of adjustment. When this happens, the manufacturing processes on the part can be performed at an incorrect location on the part resulting in slight misalignment of the elements of the finely manufactured product, or if the misalignment is severe, a completely rejected part. The result is a degradation of quality and increased cost of manufacturing.

A new manufacturing technique has been invented called "soft tooling" or "virtual tooling" which eliminates the need for hard tooling used for the positioning of holes, fasteners, and other manufacturing processes. The virtual tooling technique uses digital information from the original engineering definition of the part to locate the holes and other items on the part without reference to hard tooling reference stops. One technique is to mount the part, such as a panel, on a fixture which holds it in a fixed position and contour but without reliance on the position of any hard stops on the fixture. The panel is then routed around its entire edge to give it the precise exterior dimensions required by the original engineering data. The holes, fasteners, and parts which are to be placed at particular positions on the panel, are located by coordination holes, also known as "positioning holes," drilled in the panel by a drilling end effector held by a highly accurate robot. The positioning of the robot is accomplished by software using positioning information derived from the engineering data for that part, so the part as manufactured is always in conformance with the most current engineering drawing of that part and does not rely on the accuracy of any hard tooling.

Any other components which must be attached to the panel are drilled at the same time or on another fixture so that the positioning holes in the panel and on the other components are precisely accurate, well within the required tolerance. After the positioning holes have been drilled, the panel and other components are removed from the fixture, and the components may be repositioned and temporarily fastened to the panel using the positioning holes. They are then drilled and permanently fastened to the panel with rivets or other permanent fasteners. Alternatively, the part may be temporarily fastened to the panel immediately after drilling the coordination holes by inserting temporary fasteners through the positioning holes while the part is still being held by the positioning and drilling end effector to secure the part on the panel at the correct location, thereby obviating the additional manufacturing step of matching the part with the correct location during permanent assembly of the part on the panel. Both of these techniques accurately locate the parts on the panel, so the care and recalibration of hard tooling becomes an obsolete requirement.

In order to eliminate the need for hard tooling positioning stops for accurately locating the components relative to the part in which the coordination positioning holes are being drilled, it would be useful for the end effector carried by the robot to be capable of positioning those components exactly in the desired position to ensure that the hole in the component and the hole in the part are drilled in the right position. One such end effector is disclosed in U.S. Pat. No. 5,127,139 entitled "STRINGER CLIP END EFFECTOR" by McCowin, et al. Another end effector required for aircraft manufacturing is one which aligns a channel-shaped workpiece such as a stringer at a desired position with respect to the drill axis and holds the stringer in that position while it drills a hole in the channel at the desired lateral position and at the desired position along its length. This end effector is disclosed in U.S. patent application Ser. No. 07/996,806 entitled WORKPIECE POSITIONING AND DRILLING END EFFECTOR filed on Dec. 29, 1992 by Peter McCowin, now U.S. Pat. No. 5,299,894.

A fixture which could be used to hold the panel while the parts are being positioned and drilled is disclosed in U.S. Pat. No. 5,249,785 entitled "Reconfigurable Fixture" filed on Apr. 20, 1992 by Paul Nelson. This fixture includes an array of headers having suction-operated holders for securely holding the panel in the desired position. The panel is unsupported between the headers and is fairly thin, so it could be dimpled or wrinkled by pressing the part with excessive force against the panel. However, the part should be pressed against the panel with sufficient force to prevent the formation of burrs on the part or the panel during the drilling of the coordination holes.

Because the "virtual tooling" manufacturing system relies on the accuracy of the robot and the end effector, it is desirable to incorporate a measuring system to confirm that the robot and the end effector are being positioned and configured accurately. In this way, errors in positioning of parts and drilling of coordination holes would go undetected by the operator only if both the machines and the measuring system were to independently and simultaneously go out of adjustment by exactly the same amount and in the same direction.

The coordination holes in the part may be at different places on different parts, so it would be desirable to be able to reconfigure the end effector to be able to position the pair of coordination holes at desired edge spacing from the flange of the part, and at desired separation between the two coordination holes. The adjustment to achieve these variable positioning of the coordination holes in the parts should be done remotely and automatically without requiring time consuming and error prone manual adjustment by the operator or down time of the manufacturing cell while the adjustment is being made.

SUMMARY OF THE INVENTION

Accordingly, it is an object of this invention to provide an improved end effector capable of picking up a part such as a shear tie, carrying the part to a desired position on a panel, pressing the part firmly against the panel at the desired position, and drilling a pair of coordination holes through the panel and the part.

Another object of this invention is to provide an improved positioning and drilling end effector that inserts temporary fasteners in the coordination holes drilled by the end effector for temporarily fastening the part to the panel.

Still another object of this invention is to provide an improved positioning and drilling end effector that can be automatically adjusted to vary the distance between the two coordination holes, and vary the spacing of the coordination holes from the edge of the part.

A further object of this invention is to provide an improved positioning and drilling end effector that has the capability to measure and report on its own configuration to ensure that the coordination holes it drills are drilled accurately and in accordance with the part definition data These and other objects of the invention are attained in an end effector adapted for connection to an arm of a machine tool or robot and for picking up a workpiece, positioning the workpiece against a panel at a desired position thereon, and drilling at least one coordination hole through the workpiece and the panel. The end effector includes a tool connector and adaptor for coupling the end effector to an arm of a robot or a machine tool. A frame is connected to the tool connector and adaptor at one end of the frame and is cantilevered at the opposite end. A shuttle is mounted for lateral motion on the frame and can be driven by a lateral motion motor to selected lateral positions in the frame. A vertical motion motor imparts vertical motion to a first lug on the shuttle and to a first support plate which is supported horizontally on the shuttle and connected to said lug for movement in a vertical direction to a desired position under control of the vertical motion motor. A drill is mounted on the support plate and has an air motor rotating a drill bit chucked in the drill, and a plunge mechanism for advancing and retracting the drill bit into and out of the workpiece and the panel for drilling a hole therein. A clamp is mounted on the frame in front of the drill for holding the workpiece in position to be drilled when the drill is operated.

DESCRIPTION OF THE DRAWINGS

The invention and its many attendant objects and advantages will become better understood upon reading the description of the preferred embodiment in conjunction with the drawings, wherein:

FIG. 1A is a perspective view of a portion of an airplane fuselage showing a stringer fastened to an airplane skin and a stringer clip and shear tie connecting the skin to a frame member;

FIG. 7A is an end elevation along lines 7A—7A in FIG. 7;

DESCRIPTION OF THE PREFERRED EMBODIMENT

Figure 1:
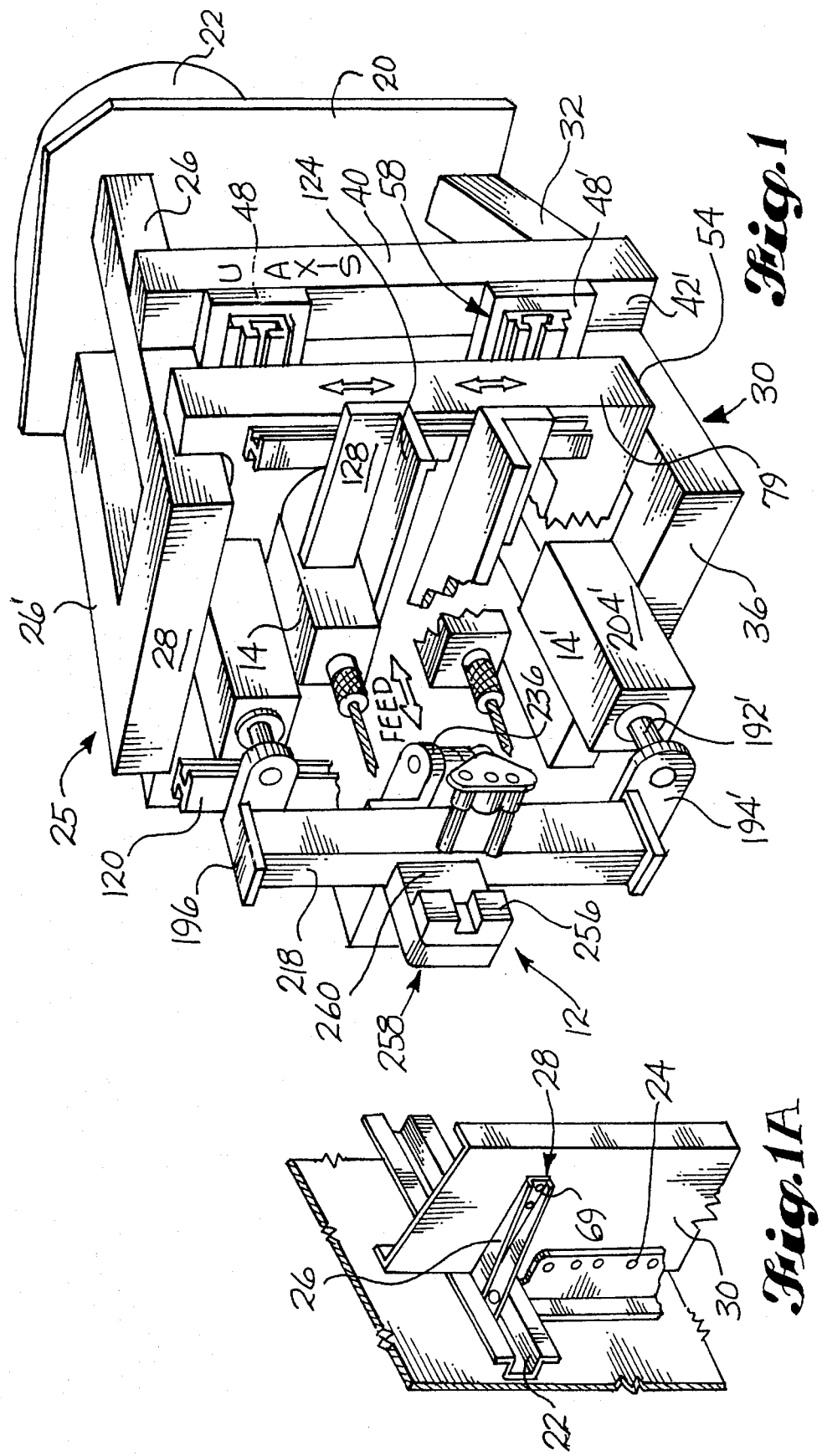
FIG. 1 is a perspective view from the right front side of an end effector according to this invention.
Figure 2:
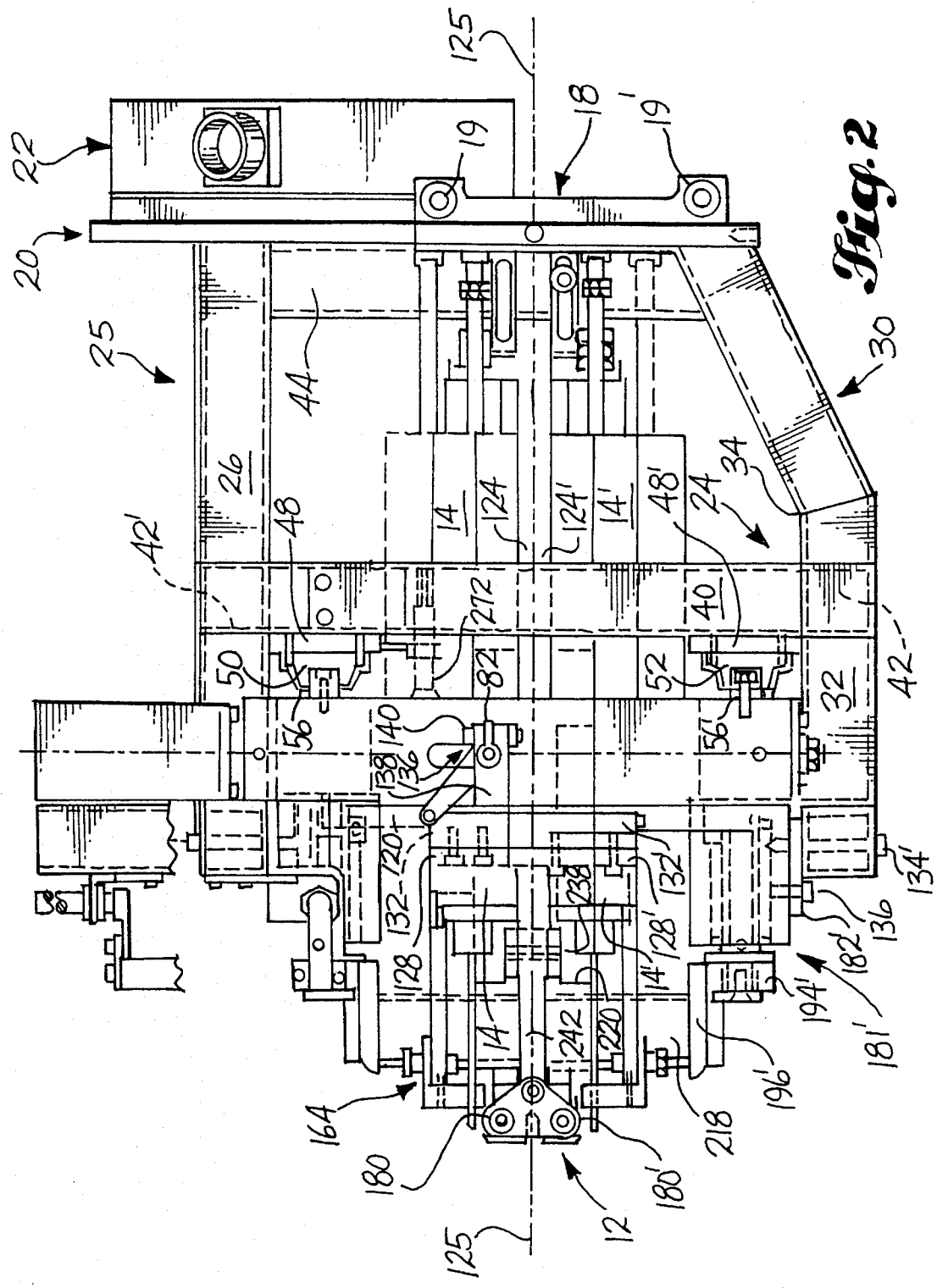
FIG. 2 is an elevation from the right side of the end effector shown in FIG. 1.
Figure 3:
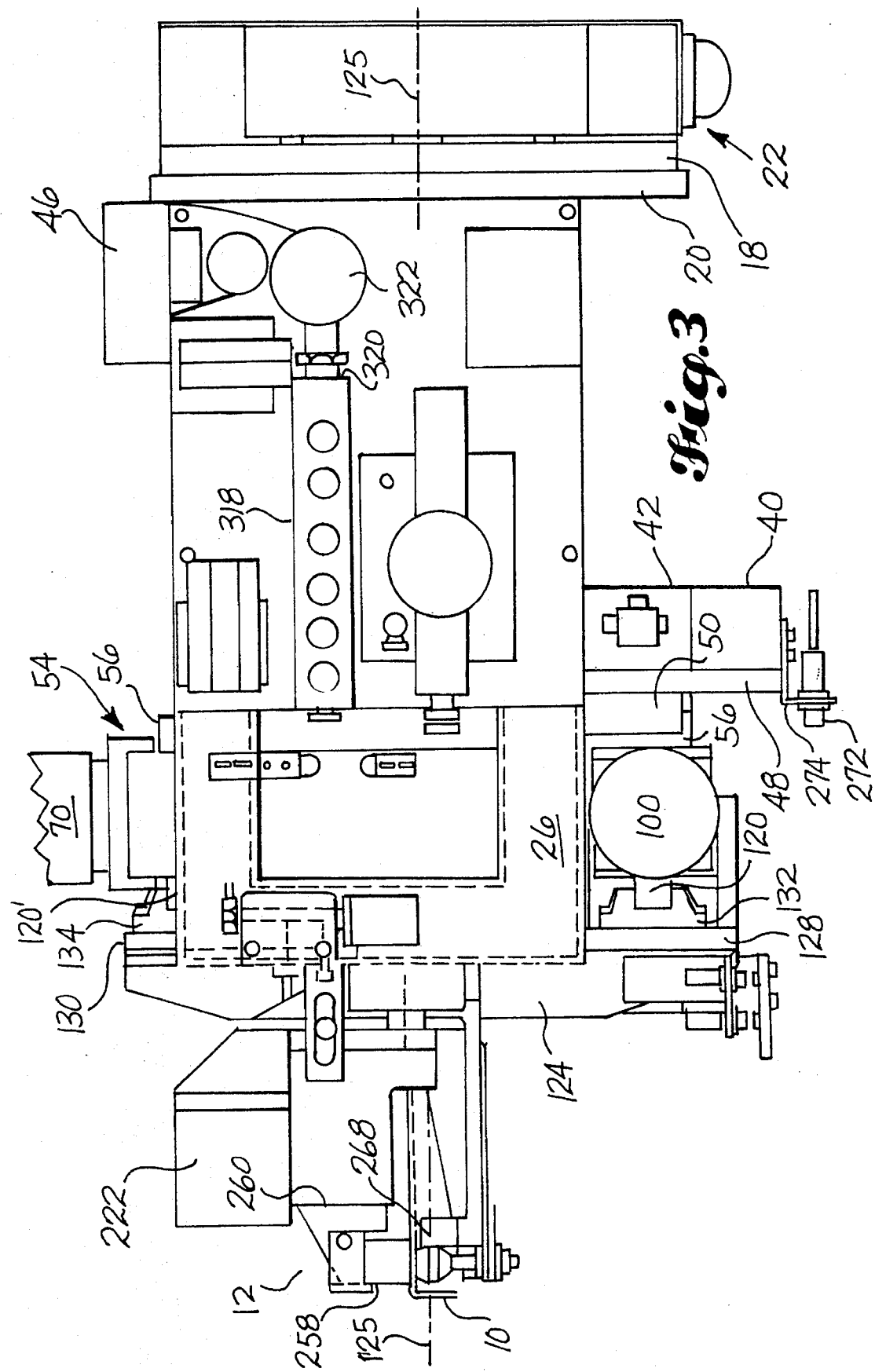
FIG. 3 is a plan view from above of the end effector, shown in FIG. 1.

Referring now to the drawings, wherein like reference characters designate identical or corresponding parts, and more particularly to FIGS. 1–3 thereof, a portion of an airplane fuselage section is shown in FIG. 1A having a curved skin 2 unto which is fastened by riveting a plurality of longitudinally extending parallel stringers 4 and a plurality shear ties 10 along station planes perpendicular to the longitudinal axis of the fuselage. The shear ties 10 are generally in the shape of a right angle and each includes a curved flange having a radius of curvature equal to that of the fuselage panel to which it is riveted, and a straight flange which lines up with other shear ties at the same longitudinal position on the fuselage to define a flat "station plane" lying normal to the longitudinal axis of the fuselage. A plurality of stringer clips 6 are positioned in the channel of each stringer 4 and each stringer clip 6 has a flat surface 8 which is designed to lie on one of the same station planes on which the shear tie straight flange surfaces lie. A frame member 9 having a curved contour the same as the desired contour of the airplane fuselage is riveted to the shear ties 10 and the stringer clips 6, as shown in FIG. 1A.

To ensure that the faying surfaces of the shear ties 10 and the stringer clips 6 lie within the designated tolerance limits of their station planes, and that the alignment of the station planes between body panels, that is, the panel-to-panel indexing of station lines, is within tolerance limits, so that the frame members 9 may be fastened to the body panels and joined in alignment without the use of shims and without stressing the panel, the stringers 4, the shear ties 10 and the stringer clips 6 must be fastened to the fuselage skin 2 with extreme accuracy and consistency. The consistency enables the use of statistical process control to detect a trend toward an out of tolerance condition before bad parts are produced so that corrective action may be taken. Accuracy of parts manufacture insures that the airplane will come together perfectly with no prestressed parts and no cosmetic imperfections. To facilitate the accurate placement and drilling of the shear ties 10, a positioning and drilling end effector is provided for gripping in a clamp 12 a shear tie 10 presented by a parts presenter (not shown) and holding the shear tie 10 while it is carried to a desired position and placed against a panel. The shear tie is held in the desired position with the curved surface of the shear tie 10 in continuous contact with the curved surface of the skin 2, while a pair of drills 14 and 14' advance and drill two coordination holes through the shear tie and the panel. A pair of temporary fastener inserters (not shown) can then insert temporary fasteners to hold the shear tie in place, or the shear tie can be stored and later rematched with the coordination holes for permanent assembly to the panel The positioning and drilling end effector includes a rear plate 20 having a gripper bracket 18 with a set of pin holes 19 to receive pins of a holding fixture disclosed in a patent application filed concurrently herewith by Zenna Dunning et al and entitled "End Effector Storage Station." The rear surface of the rear plate has attached thereto a tool connector and adapter 22 such as an Omega II available from Applied Robotics in Schenectady, N.Y. The Omega II tool connector and adapter has electrical, hydraulic and pneumatic receptacles for providing electrical power and pressurized air and hydraulic fluid to the end effector. The tool connector and adapter 22 mates with a corresponding connector and adapter mounted on the end of an arm of a robot or a machine tool such as a JOMACH 16 available from JOBS in Pizenzia, Italy.

Although the end effector can be and is used in many orientations, the description herein will be with respect to the orientation shown in FIG. 1. Descriptive words such as "vertically, under, over, etc" in which the position or orientation of one part is related to another will refer to this orientation of the end effector. However, this position reference is merely for convenience of description and should not be given any limiting effect other than to relate the parts to one another.

The end effector has an open frame 24 made up of tubular aluminum frame members welded together in a rigid structure for supporting the operating elements of the end effector. The frame 24 includes a top U-shaped section having two parallel top legs 26 and 26' connected at their outer ends by a top cross member 28, and connected at the opposite ends to the rear plate 20. A bottom U-shaped section 30 of the frame 24, shown in FIGS. 2 and 4, incldues two parallel bottom legs 32 formed at 34 at an angle of about 20° and connected at their front ends by a lower cross member 36, and connected at their rear ends to the rear plate 20. The top and bottom U-shaped sections are connected by a left hand vertical member 38 welded vertically in line with and between the left hand legs 26' and 32'. A right hand vertical member 40 is connected between two horizontal extensions 42 and 42' welded to and projecting outward from the top and bottom legs 26 and 32 on a lateral plane intersecting the left hand vertical member 38 and parallel to the plane of the rear plate 20. A second left hand vertical member 44 is welded between the top and bottom left hand legs 26' and 32' at the rear ends of those legs, and is also welded to the front face of the rear plate 20 for attachment of an electrical junction box 46.

Upper and lower bearing support plates 48 and 48' are welded to and span the distance between the left and right hand vertical members 38 and 40 immediately adjacent the underside of the top U-shaped section 25, and the top side of the bottom U-shaped section 30, respectively. A pair of upper bearing blocks 50 and 50' is attached to the upper bearing support plate 48, and a pair of lower bearing blocks 52 is attached to the lower bearing support plate 48'.

A shuttle 54 is mounted on the frame 24 for lateral movement parallel to the rear plate 20. A pair of vertically spaced parallel horizontal rails 56 and 56' is mounted on the back side of the shuttle 54 and extends across its full width. The rails 56 and 56' are engaged in and supported by the bearing blocks 50 and 52, respectively and, with the bearing blocks, constitute a horizontal linear bearing 58 for supporting and guiding linear horizontal motion of the shuttle 54 parallel to the rear plate 20.

Figure 5:
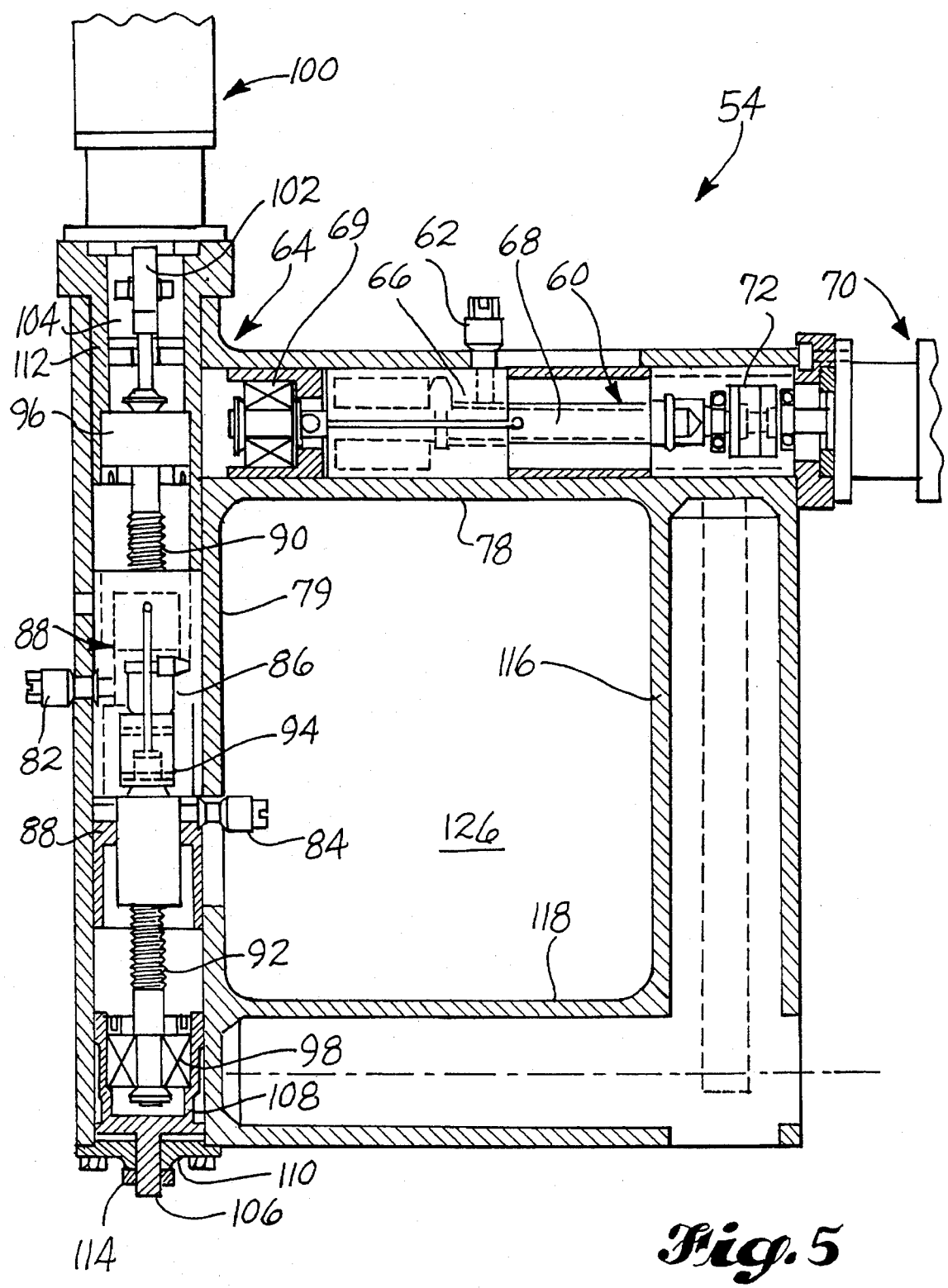
FIG. 5 is a cross sectional elevation from the rear of the shuttle 54 shown in FIG. 1.

Turning now to FIG. 5, control of the lateral position of the shuttle 54 is achieved by operation of an upper translating mechanism 60 which causes linear motion of a translating lug 62 relative to a housing 64 of the shuttle 54. The translating lug 62 is gripped by a split clamp (not shown) welded to the back side of the top cross member 28 and extending back over the top of the top of the shuttle housing. The translating lug 62 projects from a preloaded nut assembly 66 engaged with a lead screw 68 journaled at one end in a Barden preloaded solid race double row ball thrust bearing 69 in the housing 64. The lead screw assembly is available from Universal Thread Grinding Company in Fairfield, Conn.

A servomotor 70 is connected to the housing 64 and coupled to the lead screw 68 through an Oldham coupling 72. The servomotor 70 is operated and controlled electrically from a controller 74 connected electrically through the connector and adaptor 22. The lateral position of the shuttle 54 is sensed by a linear encoder 76 (shown in FIG. 10) and by various other sensors to be described below, so the controller is always informed of the lateral position of the shuttle 54.

As shown in FIG. 5, the shuttle housing 64 is a rectangular frame-like structure made of square aluminum tubing. It has a top horizontal tube 78 in which the horizontal translating mechanism 60 is mounted, and a right hand vertical tube in which a vertical translating mechanism 80 is mounted. The vertical translating mechanism 80 includes two translation lugs, an outside lug 82 and an inside lug 84. The two lugs 82 and 84 are connected to a pair of nut assemblies 86 and 88, respectively, which are threadedly engaged with a pair of axially aligned and end-coupled lead screws 90 and 92. The lead screws are coupled at their abutting ends by a coupling 94 and are supported at their remote ends in bearings 96 and 98, respectively.

A servomotor 100 is connected to the shuttle housing 64 at the top of the right hand vertical tube and drives a spindle 102 coupled to the lead screw 90 through an Oldham coupling 104. As shown in FIG. 5, the lead screw 90 has a right hand thread and the lead screw 92 has a left hand thread, so rotation of the lead screw 90 by the servomotor 100 will cause the nut assemblies 86 and 88 and their attached translation lugs 82 and 84 to travel in opposite vertical directions. The midpoint between the translation lugs 82 and 84 can be adjusted by rotating a threaded shank 106 of a bearing housing 108 containing the bearing 98. The shank is threadedly engaged in a threaded hole in a cap 110 fastened to the lower end of the right hand vertical tube 79. Rotation of the shank 106 causes vertical movement of the bearing 98 and the coupled lead screws 90 and 92 along with their nut assemblies 86 and 88 and the connected translation lugs 82 and 84. The upper bearing 96 is mounted in a bearing housing 112 that is slidable in the square tube 79, and there is enough overlap in the coupling 104 that vertical movement of the lead screw side of the coupling can be accomodated without disengaging the coupling. Once the midpoint of the translating lug 82 and 84 is adjusted to the correct position, a jam nut 114 is threaded onto the shank 106 and torqued down tight against the cap 110 to hold the bearing housing 108 in the adjusted position.

The left side of the top tube and the bottom end of the right hand vertical tube 79 are connected by a left hand vertical tube 116 and a bottom horizontal tube 118. A vertical track 120 and 120' is mounted on the front faces of the vertical tubes 116 and 79, respectively. The vertical tracks 120 and 120' are part of a vertical linear bearing 122 which supports a pair of drill support plates 124 and 124' whose vertical position is controlled by the vertical translating mechanism 80 in the shuttle 54.

The two drill support plates 124 and 124' are disposed horizontally equally spaced above and below, respectively, an end effector longitudinal centerline 125, and extend from the front side of the shuttle 54 through a rectangular opening 126 formed by the four tubes of the shuttle 54. Each plate 124 and 124' has a pair of horizontally spaced vertically oriented hanger blocks 128 and 130 welded adjacent the outside edge of the support plates 124 and 124'.

A bearing block 132 and 134 is bolted to each hanger block 128 and 130, respectively, and the bearing blocks 132 and 134 are engaged with the vertical tracks 120 and 120' mounted on the vertical tubes 79 and 116. The tracks 120 and the bearing blocks 132 and 134 constitute a pair of linear bearings that guides and supports the drill support plates 124 and 124' for vertical movement therealong under control of the vertical translating mechanism 80.

The outside translating lug 82 of the vertical translating mechanism 80 is gripped by a top clamp 136 which is formed on the rear end of an attachment block 138, the front end of which is attached to the right hand hanger block 128. The clamp 136 includes a hole 137, shown in FIG. 7, which receives the translating lug 82, and a screw 140 which squeezes two split sides of a split rear end 139 of the attachment block 138 to tighten the sides of the hole in the attachment block onto the translating lug 82 where it is received in the hole 137.

Figure 4:
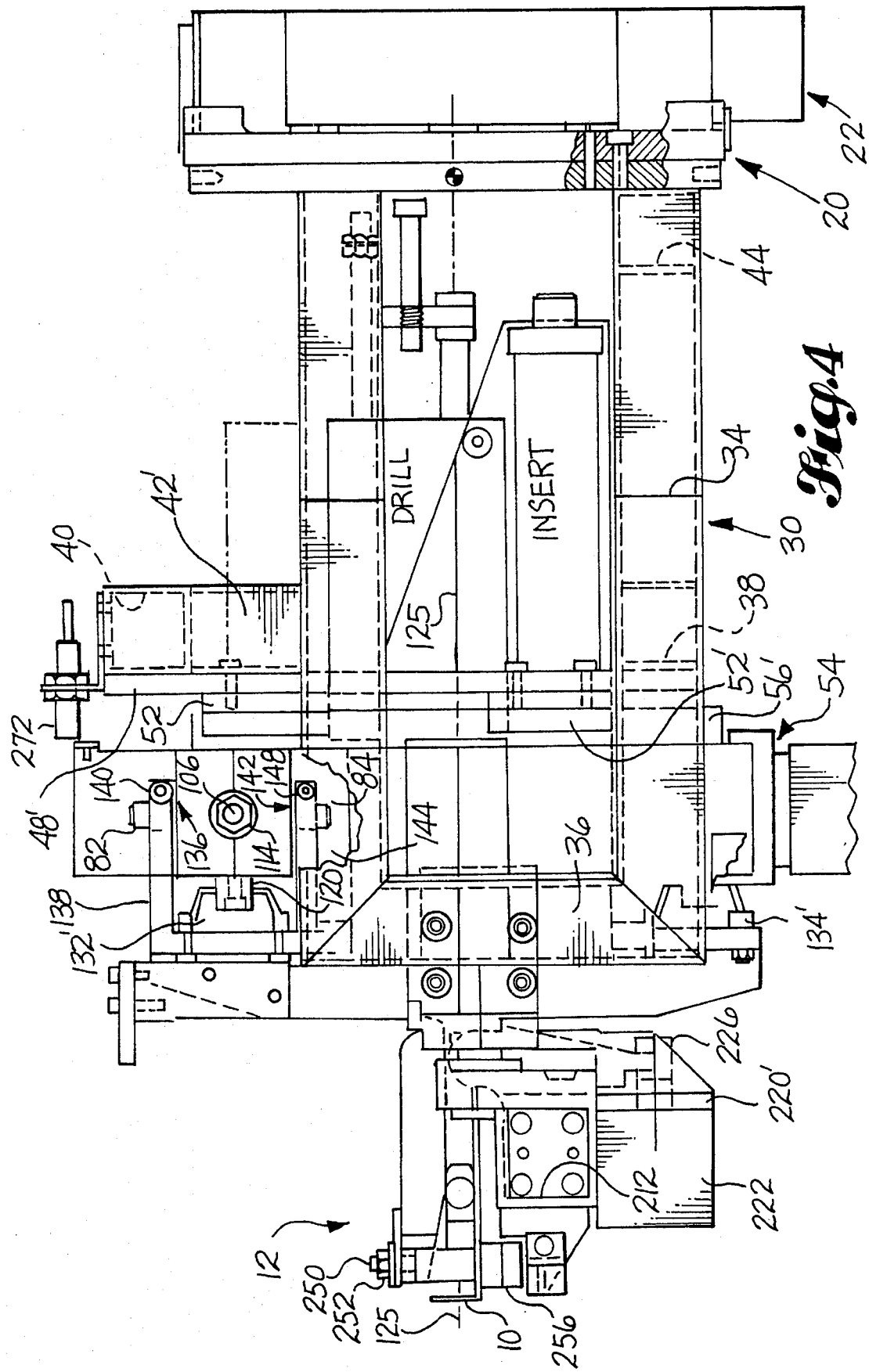
FIG. 4 is a plan view from below, partly in section and partly cut away, of the end effector shown in FIG. 1.

As shown in FIG. 4, vertical movemement of the lower drill support plate is controlled by the inside translating lug 84 of the vertical translating mechanism 80. The inside lug 84 is gripped by a bottom clamp 142 which is formed on the rear end of an attachment block 144, the front end of which is attached to the right hand hanger block 128' of the lower drill suport plate 124'. The bottom clamp 142 includes a hole which receives the translating lug 84, and a screw 148 which squeezes two split sides of a split rear end of the attachment block 144 to tighten the sides of the hole in the attachment block onto the translating lug 84 where it is received in the hole.

Operation of the vertical translating mechanism by driving the connected lead screws 90 and 92 by the servomotor 100 causes the nut assemblies 86 and 88 and their attached lugs 82 and 84 to travel along the lead screws 90 and 92 in opposite directions, depending on which way the spindle 102 of the servomotor 100 rotates. The clamps 136 and 142 on the attachment blocks 138 and 144, respectively, transfer the vertical motion of the lugs 82 and 84 to the drill support plates, and the plates are maintained in horizontal and parallel orientation throughout their vertical range of motion by the bearing blocks 132 and 132' engaged with the vertical track 120, and by the the bearing blocks 134 and 134' engaged with the vertical track 120'.

Figure 6:
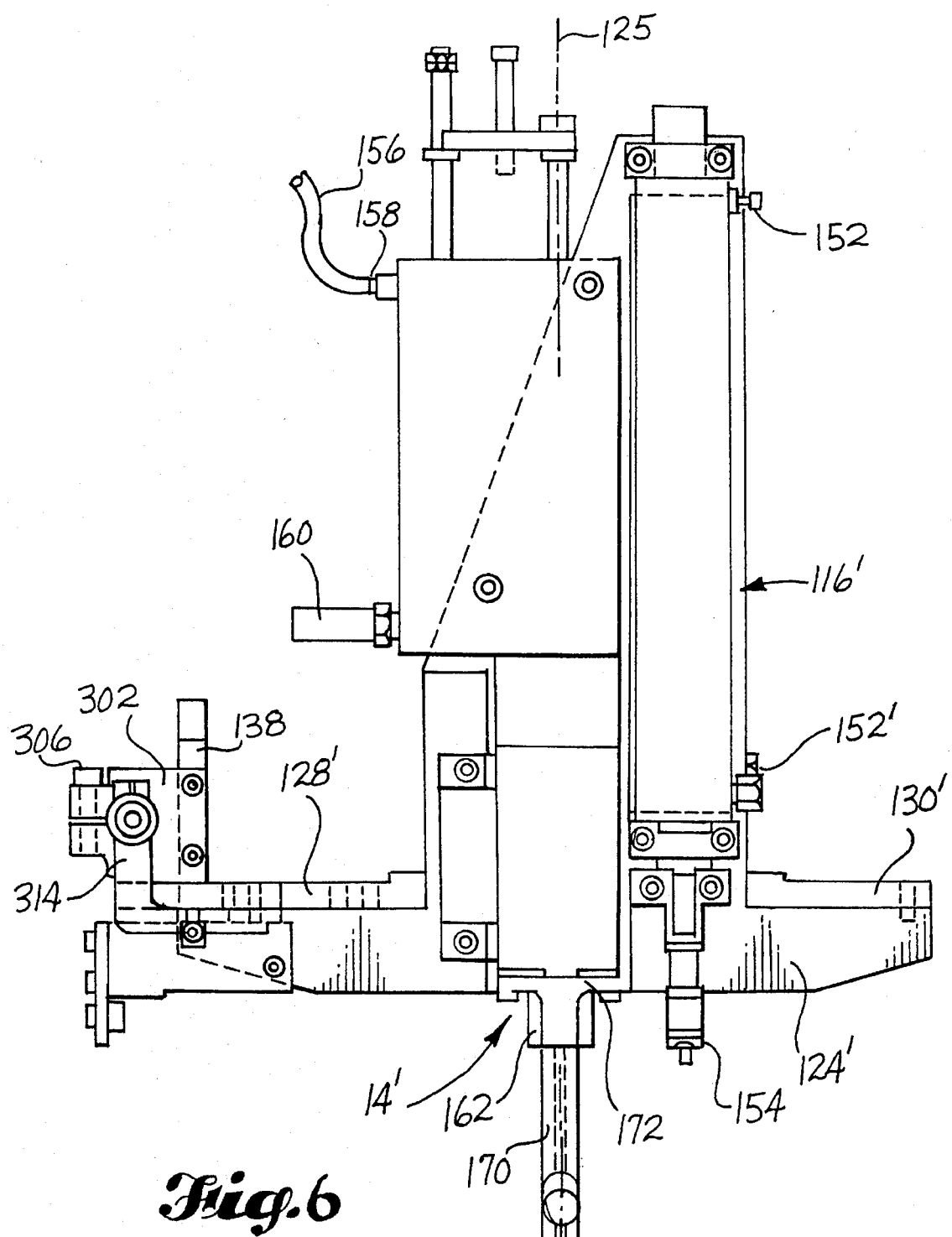
FIG. 6 is a plan view from below of the bottom support plate for the drill and inserter of the end effector shown in FIG. 1.

The drill support plates 124 and 124' each support an inserter 16 of temporary fasteners and a drill 14. The drill can be Bohlins model BE 22 pneumatically driven, hydraulically fed devices. The inserters 16 and 16' mounted on the top support plate 124 and the on the bottom support plate 124', shown in FIG. 6, are pneumatically operated devices. Air pressure to operate the inserters 16 is supplied through fittings 152 and 152' under control of the air pressure control system as described below. A chuck 154 is mounted on the front end of the inserter 16' for holding a temporary fastener which is manually loaded into the inserters, or the inserter picks up the temporary fastener from a feeding station near a parts presenter which presents the shear tie 10 to the end effector to pick up. After the coordination holes are drilled by the drills 14 and 14' through the shear tie 10 and the panel, and while the clamps 12 are still holding the shear tie 10 in position, the shuttle 54 is shifted horizontally by the horizontal translation mechanism to index the inserters 16 and 16' horizontally into line with the drilled holes. The inserters 16 and 16' are triggered to advance forward to insert the temporary fasteners through the drilled holes and then release the temporary fasteners which hold the shear tie in place at the correct location on the panel.

The drills 14 and 14' are mounted on the top and bottom drill suport plates 124 and 124', respectively. Each drill includes an air operated motor of the vane type which is powered by air under pressure supplied from an air supply system described below. The air from the air supply system is delivered through an air supply line 156 to a fitting 158 and is exhausted out of the motor through a muffler 160. The drills are available from The Nichols Co. in Troy, Mich. They include a closed cycle hydraulic feed system which can be triggered to advance the drill spindle into the workpiece at a selected rate. The drills each include a quick change chuck 162 which can release a drill bit 180 for replacement merely by pulling forward on a knurled sleeve surrounding the chuck 162.

A drill guide 164 for holding a drill guide sleeve 166 in line with the longitudinal axis 168 of the drill 14 is fastened to the front of the drill 14. The drill guide 164 includes a stanchion 170 connected to a mounting plate 172 that is screwed to the front face of the drill 14. A right angle bracket 174 is fastened to the front end of the stanchion 170 with a screw having a knurled knob, and an index pin 178 to ensure that the bracket 174 is aligned correctly with the a drill bit 180 held in the chuck 162.

A compliant mount 181 for the clamp 12 is secured at the top to a top mounting plate 182 welded to the underside of the top cross member 28 of the top U-shaped sections 25 of the frame 24 by bolts 184 and 186, and is secured at the bottom to a bottom mounting plate 188 welded to the top side of the bottom cross member 36 of the bottom U-shaped section 30 of the frame 24 by bolts 184' and 186'. The top and bottom compliant mounts 181 and 181' for the clamp 12 includes, each having a piston 192 connected to a flange 194 of a mounting bracket 196. The inner end of the piston 192 is bored axially at 198 and receives a compression spring 200. The piston 192 is slidably received in a cylinder liner 202 of a cylinder 204 which is mounted by bolts 184 and 186 to the mounting plate 182. The piston 192 is guided in the cylinder liner 202 for linear motion in the direction of the end effector longitudinal centerline 125. A stub piston 206 is mounted on the inside of a rear wall 208 of the cylinder 204 and extends into the inner end of the bore 198. The spring 200 is thus compressed between the outer end of the stub piston 206 and the outer end of the bore 198 to exert an outward biasing force on the clamp 12.

An annular disc 210 is mounted on the piston 192 adjacent the inner end thereof. The disc 210 engages a resilient ring 212 disposed against a shoulder in the cylinder. The disc 210 and the resilient ring 212 constitute an outer travel limit for the piston 194 and determine the nominal position of the clamp along the longitudinal centerline 125 of the end effector.

The outer end of the piston 192 is necked down and received in a hole in the flange 194 where it is secured by a screw 214 threaded into a tapped hole in the outer end of the piston 192. A resilient disc 216 is disposed against the inner face of the flange 194 surrounding the piston 192 to provide a resilient bumper to cushion the contact of the flange 194 against the piston 204 at the point of maximum inner travel of the piston 192 into the cylinder 204.

A square tube 218 is welded to and extends vertically between the mounting brackets 196 and 196' to provide a support on which the clamp 12 is mounted. A pair of right angle brackets 220 and 220' is welded to the back side of the square tube 218 and extend laterally to left side of the tube 218 to support an air cylinder 222 secured to the brackets 220 by screws 224 and 224'. The air cylinder has a piston 226 having a notch 228 machined into the side facing the square tube 218 for receiving rounded end 230 of a lateral arm 231 of a bell crank 232. The brackets 220 and 220' each include an inwardly extending horizontal flange 234 between which the lateral arm 231 lies and by which it is supported. The flanges 234 and 234' extend slightly to the right of the square tube 218 and are rounded to form upper and lower parts of a clevis 236. A clevis pin 238 extends through a vertical hole through the top and bottom parts of the clevis 236, and through a hole in the bell crank 232 adjacent a right angle bend 240 therein to provide a pivot for the bell crank 232.

The bell crank 232 has longitudinally extending arm 242 having a free inner end to which a triangular plate 244 is fastened by a pair of cap screws 246. The triangular plate projects above and below the arm 242 and supports a pair of vertically spaced laterally extending gripper studs 248 having threaded ends 250 projecting through holes in the triangular plate and secured by nuts 252. A gripper pad 254 is secured to the distal end of each of the gripper studs 248 for gripping a shear tie 10 between the pads 254 and a pair of anvil pads 256 mounted on an anvil 258.

The anvil 258 includes an anvil mounting block 260 welded on the front side of the square tube 218 on the side opposite the right angle brackets 220. A notch 262 is machined into the right side of the anvil mounting block 260 and receives a steel anvil 264 which has two vertically spaced, horizontally projecting anvil pads 266 horizontally aligned with the gripper studs 248. The end faces 268 are positioned by the JOMACH machine tool precisely on the panel station plane which a frame member of an aircraft fuselage will abut when the aircraft is assembled. In this way, when the aircraft is assembled, the shear tie surface which is positioned against the anvil pad end faces 268 will abut the frame members and can be riveted thereto without shims.

Figure 10:
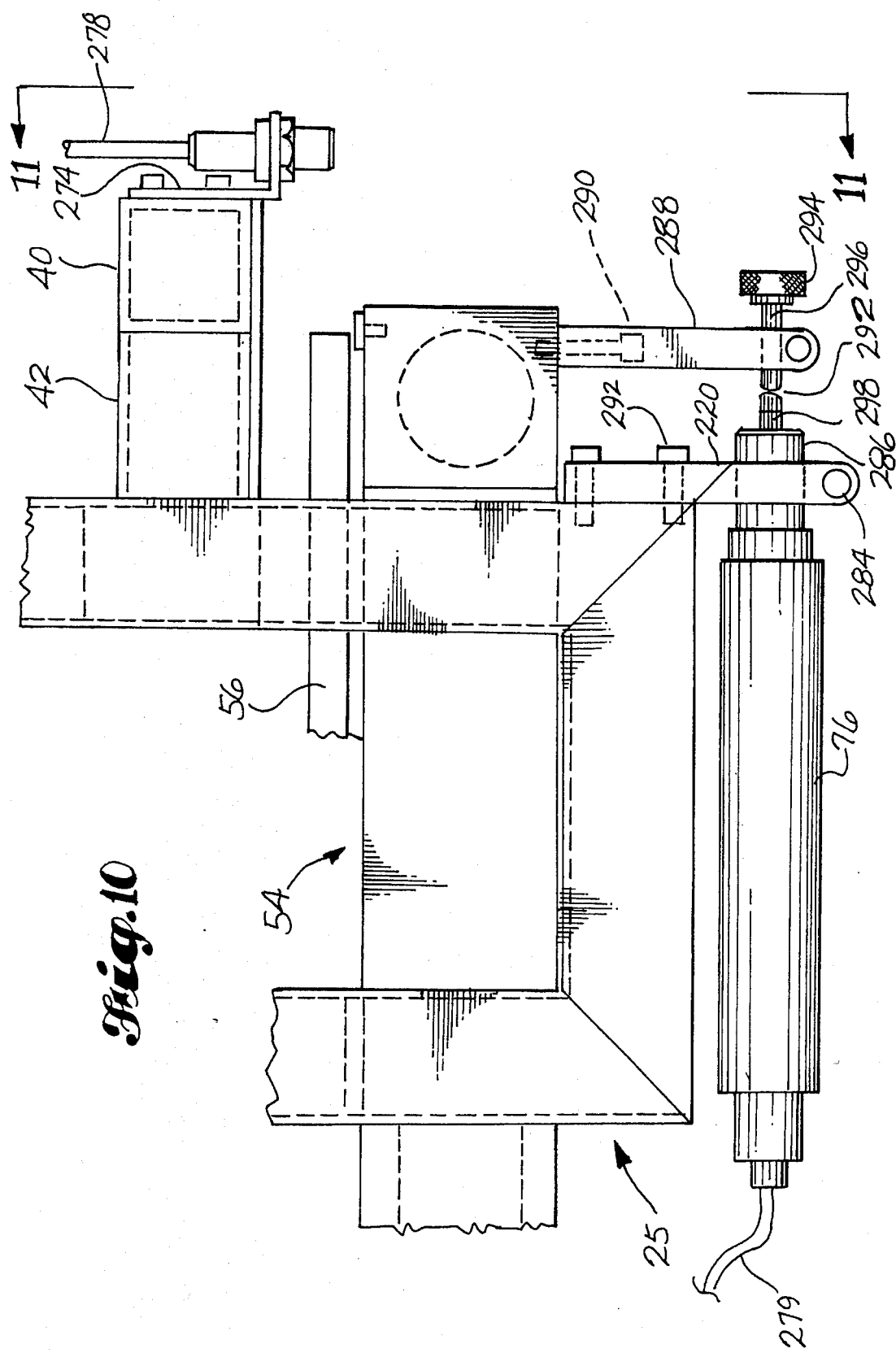
FIG. 10 is an enlarged plan view from the top of the outer end of the end effector frame and the shuttle, and some of the sensors mounted thereon.
Figure 11:
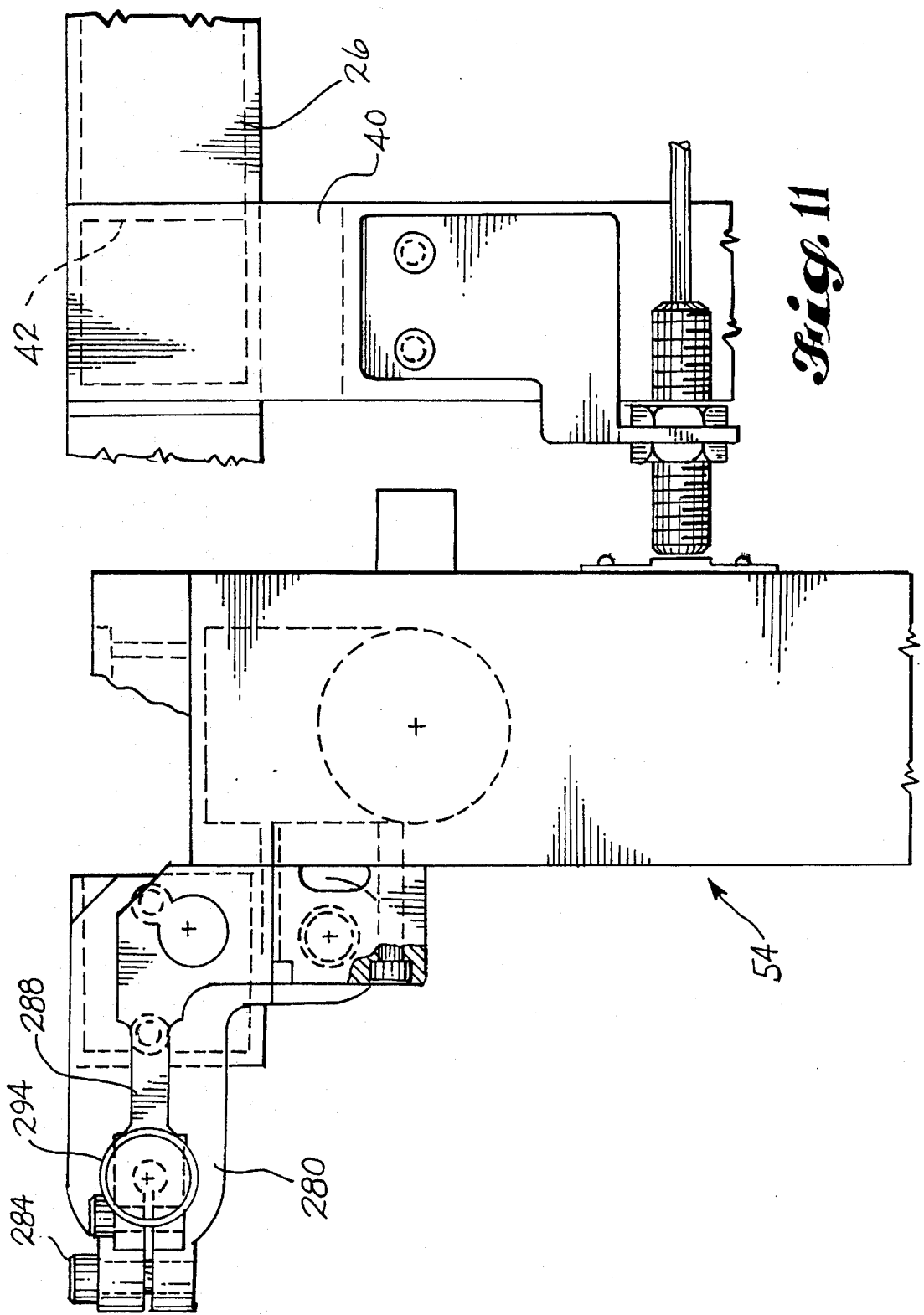
FIG. 11 is an elevation from the right side showing portions of the shuttle and the frame, and some of the sensors mounted thereon.

A series of sensors, shown in FIGS. 10 and 11, is provided to give position data feedback to the system controller 74 to control the position and adjustment of the end effector. A lateral position proximity end sensor 272 is fastened to a bracket 274 screwed to the right hand vertical member 40 to sense the movement of a target 276 into alignment with the sensor. The sensor will generate a signal that is conducted through a conductor 278 and through one of the electrical pin connectors in the connector and adaptor 22 to the controller 74 to signal the movement of the shuttle 54 to the designed end of its travel. Movement beyond this point is prevented by the controller 74 to prevent damage to the mechanisms of the end effector.

The linear encoder 76 provides accurate feedback to the system controller 74 via a conductor 279 about the lateral position of the shuttle 54. A bracket 280 is screwed to the U-shaped section by screws 282 and secures the linear encoder 76 to the outer end of the top U-shaped section 25 of the frame 24. A screw 284 tightens a split clamp on the end of the bracket around the neck 286 of the linear encoder to hold it in position. A bracket 288 is screwed to the right side of the shuttle 54 by screws 290 and projects forwardly to hold an adjustable contact 292 at the distal end of the bracket 288. The lateral position of the contact 292 can be adjusted by turning a thumb screw 294 of a fine threaded screw shank 296 in a threaded bore to advance or retract the shank 296 in the threaded bore and shift the lateral position of the contact 292. The linear encoder 76 has a spring loaded plunger which remains in contact with the contact 292 and provides position reference for magnetic or other readers inside the body of the encoder disposed around the plunger.

Figure 7:
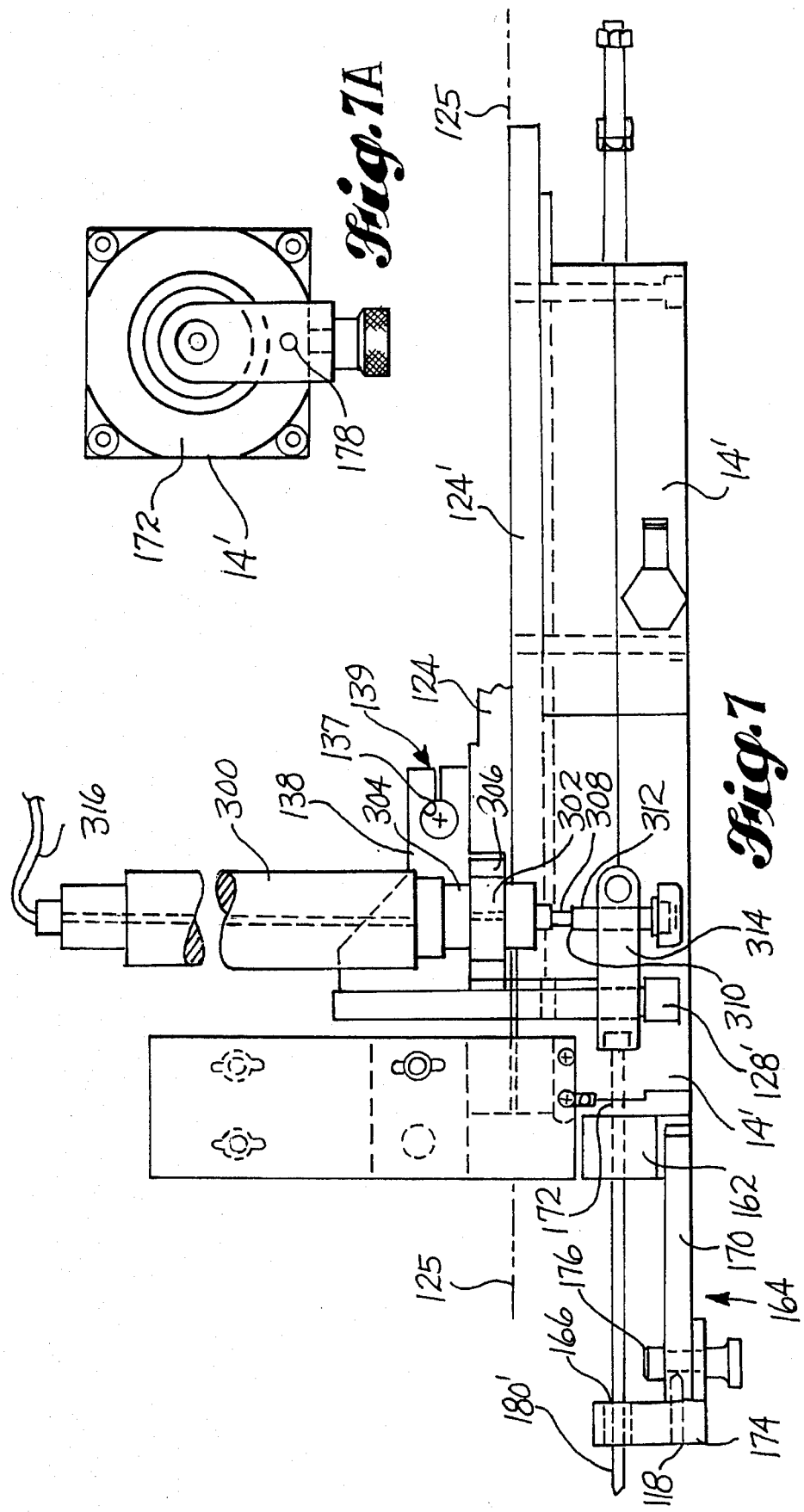
FIG. 7 is an elevation from the right side of the bottom support plate and portions of the top support plate of the end effector shown in FIG. 1.
Figure 8:
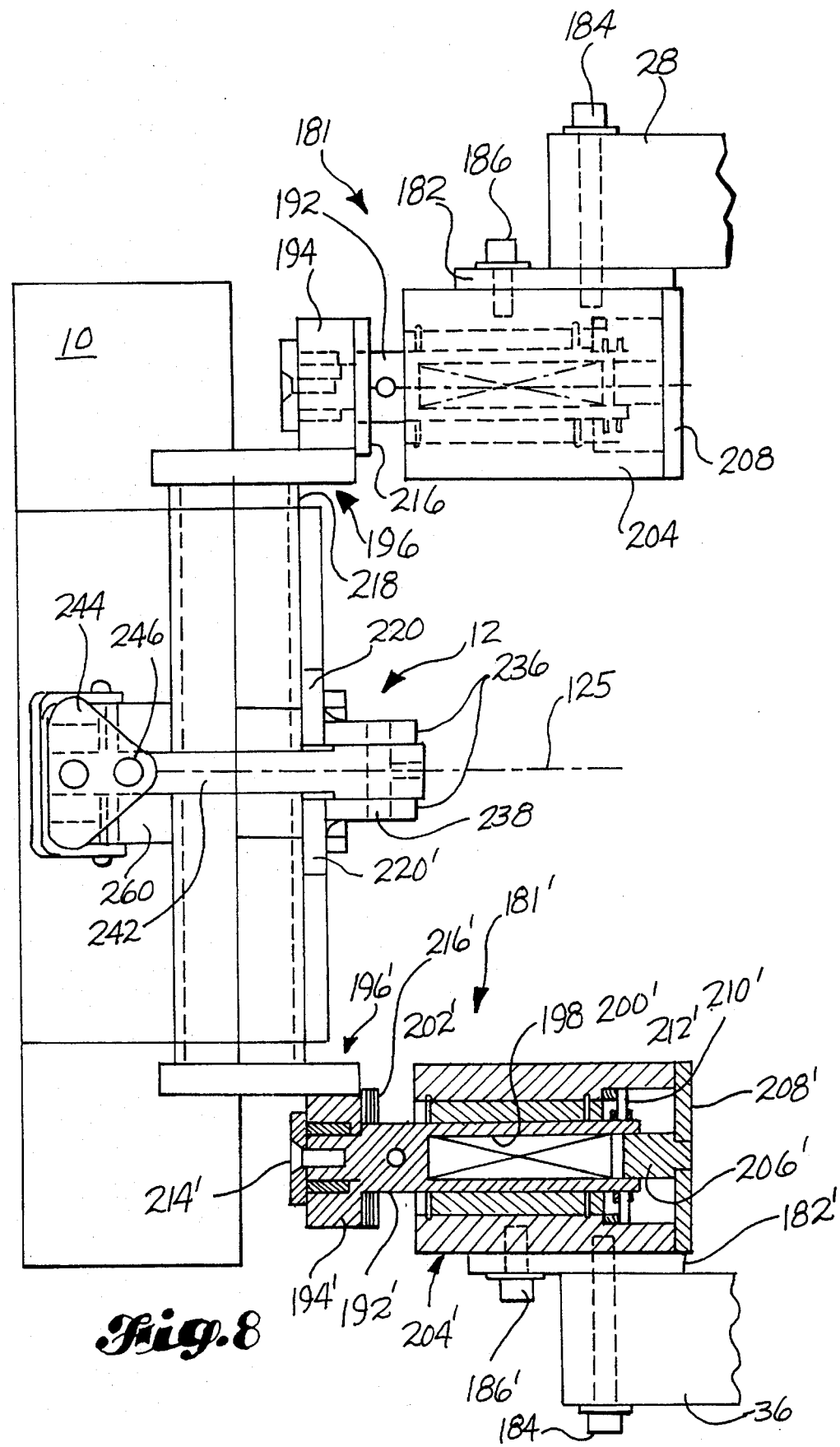
FIG. 8 is an elevation, partly in section, of a clamp and compliant mount on the end effector shown in FIG. 1.
Figure 9:
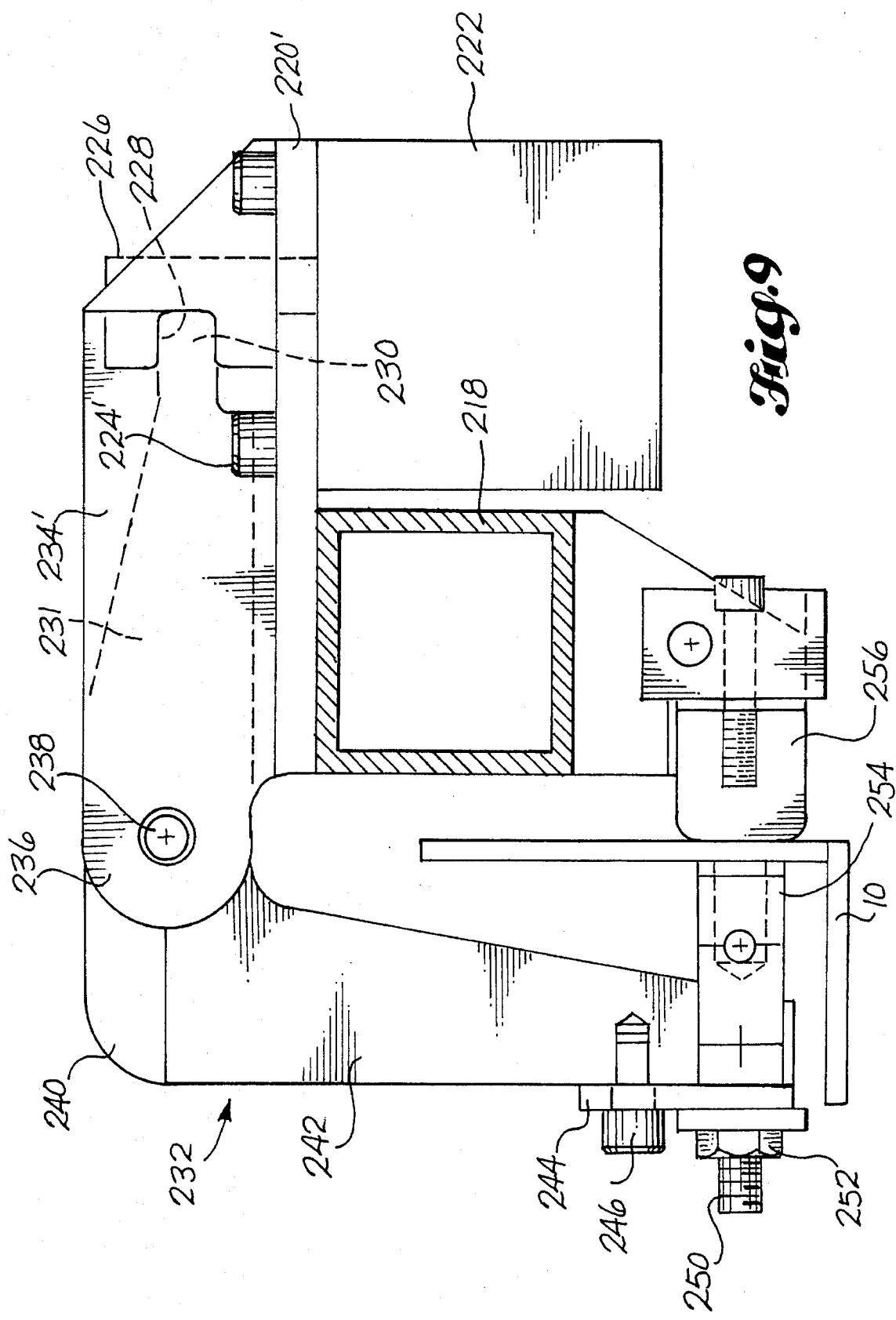
FIG. 9 is a plan view from below of the clamp shown in FIG. 8.

An identical linear encoder 300 shown in FIG. 7 is mounted for movement with the top drill support plate. It is supported in a bracket 302 which is screwed to the under side of the attachment block 138 and projects outward on the right side of the end effector. The bracket 302 is of the split clamp type and is tightened around the neck 304 of the encoder 300 by a screw 306. The vertical encoder 300 provides information regarding the vertical separation of the drills 14 and 14' by a plunger 308 which contacts a contact 310 which is the end of a fine threaded screw 312 screwed into a fine threaded bore in the end of a bracket 314 mounted on the bottom hanger 128'. When the vertical distance between the drill support plates 124 and 124' is changed, that change will be detected by the movement of the spring loaded plunger 308 and the magnitude of the change will be detected by the read heads inside the vertical linear encoder 300. That information will be conveyed to the system controller 74 via a conductor 316 and one of the pins in the tool connector and adaptor 22.

Figure 12:
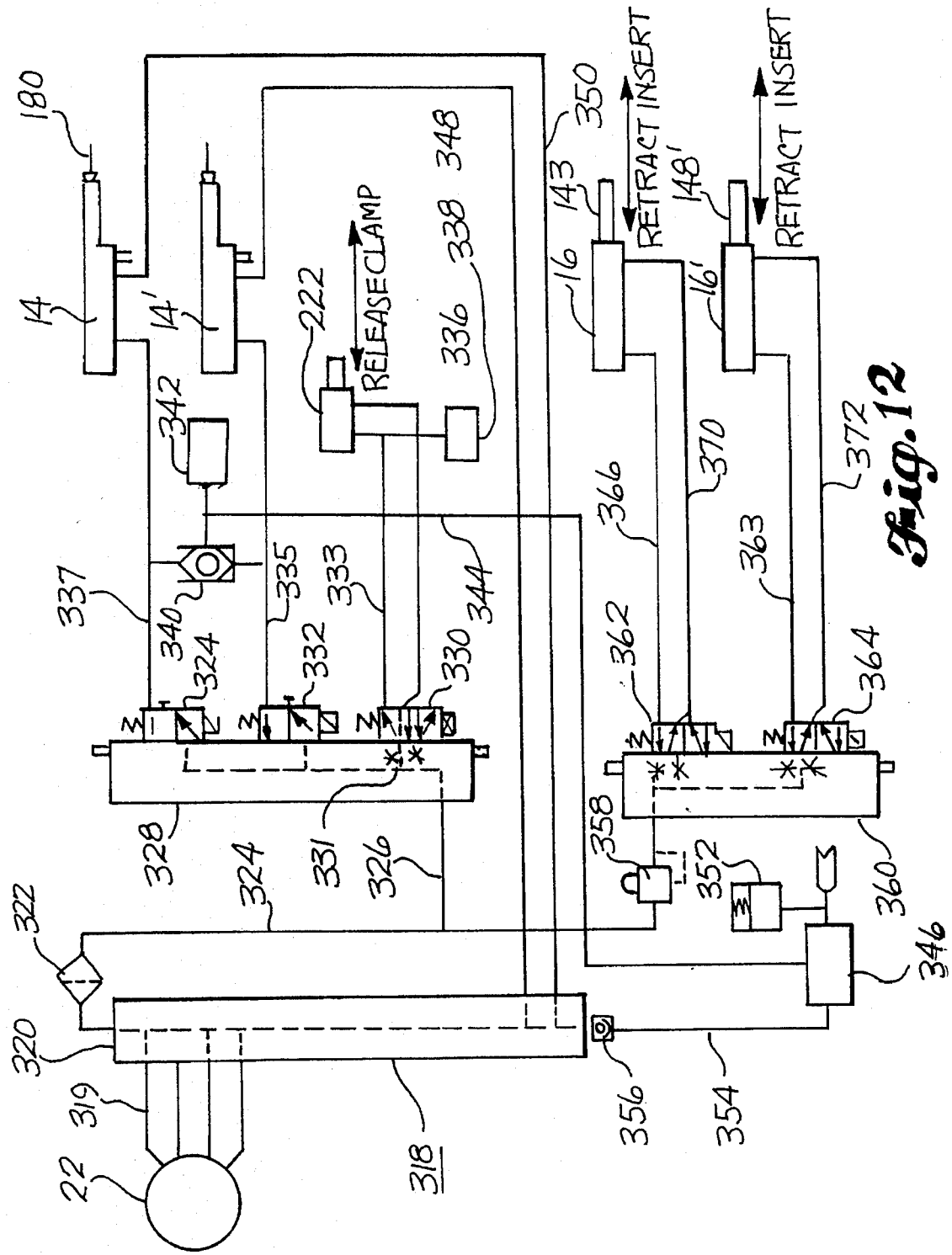
FIG. 12 is a schematic diagram of the pneumatic system for the end effector shown in FIG. 1.

A pneumatic system shown in FIG. 12 provides the air pressure to operate the clamp 12, the drills 14, and the inserters 16. The pneumatic system includes a manifold 318 that receives air under pressure through air supply lines 319 from an air coupling in the tool connector and adaptor 22. Air from the rear end 320 of the manifold 318 passes through a filter 322 and is delivered via a air lines 324 and 326 to a manifold 328 to which is connected three solenoid valves 330, 332, and 334.

The valve 330 controls air to the air cylinder 222 of the clamp 12. The air flows to the solenoid valve 330 through a flow control restrictor 331 which controls the rate at which the clamp 12 can close. When air pressure is applied to the air cylinder via line 333, a pressure switch 336 sends a signal via a conductor 338 to the system controller 74 that the clamp 12 is closed.

When the JOMACH 16 has positioned the end effector at the location to place a shear tie 10 against the panel, one or both solenoid valves 332 and 334 are energized by signals from the controller 74 to pressurize air lines 335 and 337. There are some shear ties that require only one coordination hole, in which case only one solenoid valve will be energized. The lines 336 and 338 are connected to control ports on the drills 14 and 14' which connect to a control mechanisms in the drills that detect the pressure and turn on the drills.

A shuttle valve 340 is connected between the lines 335 and 337 to isolate the control port in one drill when only the other drill is to be turned on. A counter 342 indexes each time it detects a pressure pulse to count the number of times the drills have been cycled. A line 344 is connected between the shuttle valve 340 and an oil injector 346 to convey signal air from the valves 332 and 334 to the oil injector to signal that the drills are being turned on and that oil should be injected into the air motor supply lines 348 and 350. The oil injector pump 346 injects a metered amount of oil from a reservoir 352 through the line 354 and through a check valve 356 into the manifold adjacent the connection of the drill air motor supply lines 348 and 350 where it is drawn by the flow of air through the lines 348 and 350 to lubricate the air motor while the air is powering the motor.

The air line 324 from the manifold 318 is also connected through a pressure regulator 358 to a manifold 360. Two solenoid valves 362 and 364 are energized by the system controller 74 to pressurize the inserters 16 and 16' through lines 366 and 368 to extend the plungers 148 and 148' on the inserters 16 and 16' to insert the temporary fasteners that hold the shear tie 10 to the panel temporarily. The system controller 74 then triggers the solenoid valves to shift and pressurize the lines 370 and 372 to retract the plungers 148 and 148'.

Figure 13:
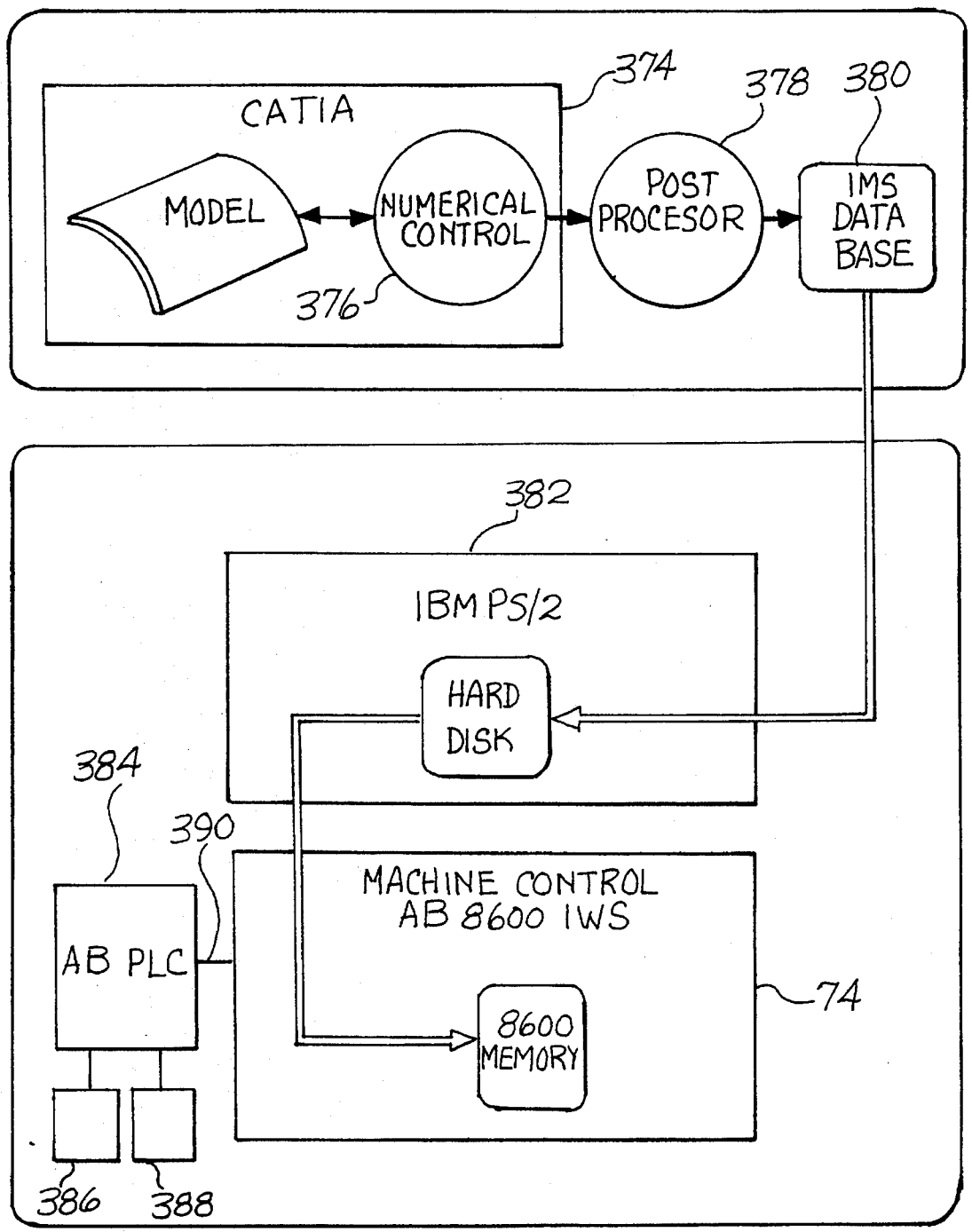
FIG. 13 is a schematic diagram showing the control architecture for the manufacturing cell in which the end effector shown in FIG. 1 is used.

Turning now to FIG. 13, the computing architecture for control of the JOMACH 16 and the end effector is shown schematically to include computer functions which are performed by a CAD/CAM main frame 374 where the original engineering digital product definition is recorded and available as the ultimate product definition authority. A numerical control 376 in the main frame 374 converts this data into a form that is usable by a post processor 378, which converts the digital parts definition data into motion commands for the arm of the JOMACH 16 when carrying the end effector and the shear tie to the correct location on the panel. An IMS data base 380 is a large capacity storage bank for storing all the parts programs that will be used by the JOMACH 16.

The other computing functions are performed at computer hardware stations in an assembly cell in which the JOMACH 16 operates, and for convenience are performed by several separate computer hardware units, an IBM PS/2 382, the machine controller 74 which in the case of the preferred embodiment is an Allen Bradley 8600 IWS, and three Allen Bradley PLC's. One PLC 384 controls the clamps in the end effector storage rack (disclosed in a patent application filed concurrently herewith by Zenna Dunning et al and entitled "End Effector Storage Unit") and the other two PLC's 386 and 388 control the reconfigurable fixture (disclosed in patent application Ser. No. 07/871,321 filed on Apr. 20, 1992 by Paul Nelson) two man lifts on the right and left banks of the assembly cell, respectively. All three PLC's communicate with the 8600 via a remote i/o line 390.

An end effector is thus disclosed which is useful for picking up an angled part such as a shear tie and (under control of a machine tool or robot arm) carrying the part to place it against a panel precisely at a desired position thereon and for drilling one or a pair of coordination holes through the part and the panel. The end effector can then shift laterally to insert one or a pair of temporary fasteners through the coordination holes to temporarily hold the part on the panel, or the part can be removed and stored for later assembly onto the panel using the coordination holes drilled by this end effector. The locations of the coordination holes is adjustable remotely with great precision so that the part definition in the original engineering data for the part is translated directly into control of the end effector to configure the drill locations so the coordination holes are drilled in the correct positions. Use of this end effector in this system eliminates the need for traditional hard tooling used for decades in the air frame industry and for the first time enables assembly of large mechanical structures in accurate conformance with the original engineering data and without reliance on the accuracy of the hard tooling.

Obviously, numerous modifications and variations of the preferred embodiment described herein will ocure to those skilled in the art in view of this disclosure. Accordingly, these modifications and variations, and the equivilents thereof may be practiced while remaining within the spirit and scope of the invention as defined in the following claims, wherein we claim:

1. A method for positioning a workpiece having a curved surface against a panel having a curved surface with the same radius of curvature and drilling at least two coordination holes at predetermined positions in the workpiece and the panel from only one side of said panel, comprising:

positioning an end effector over a part with a clamp on said end effector bracketing said part;

energizing said clamp to grip said part moving said end effector to place said part flush against said panel, with said curved surfaces in continuous contact; and drilling at least one coordination hole through said part and said panel while pressing said part against said panel with said end effector.

2. A method for positioning a workpiece against a panel and drilling at least one hole at a predetermined position in the workpiece and the panel, comprising;

positioning an end effector over a part with a clamp on said end effector bracketing said part;

energizing said clamp to grip said part moving said end effector to place said part against a panel; and drilling at least one coordination hole through said part and said panel; and configuring adjustable drill support structures on said end effector to position drills at locations in said end effector using positioning data derived directly from original part definition engineering data.

3. A method as defined in claim 2, wherein said configuring step comprises:

laterally shifting a shuttle on which said drills are mounted to adjust the lateral position of said drills.

4. A method as defined in claim 2, wherein said configuring step comprises:

supporting two support plates horizontally in said end effector, said mounting plates each connected to one of said drills; and vertically shifting said mounting plates on a shuttle an equal distance from a centerline between said plates.

5. A method as defined in claim 4, wherein:

said supporting step includes engaging a pair of horizontally spaced bearing blocks with a pair of vertically oriented guide rails fastened to said shuttle.

6. A method as defined in claim 4, wherein:

said vertically shifting step includes engaging each of said support plates with one of a pair of translating lugs connected to a pair of nuts which are threadedly engaged with a vertically oriented lead screw mounted in said shuttle; and rotating said lead screw to cause said translating lugs to translate vertically along said lead screw.

7. A method as defined in claim 6, wherein:

said lead screw has a right hand thread on one portion on which one of said nuts is threaded, and a left hand thread on another portion on which the other nut is threaded, whereby rotation of said lead screw in either direction causes said nuts to travel along said lead screw in opposite vertical directions.

8. A method as defined in claim 6, wherein:

said rotating step includes energizing a servomotor which is coupled to one end of said lead screw until said lead screw has driven said nuts to position said translating lugs and said plates at a desired position; and deenergizing said servomotor when said plates have reached said desired position.

9. A method as defined in claim 8, wherein:

said energizing step is performed by a machine control system using position control instructions derived directly from the original engineering part definition data.

10. An end effector adapted for connection to an arm of a machine tool or robot and for picking up a workpiece, positioning the workpiece against a panel at a desired position thereon, and drilling at least one coordination hole through the workpiece and the panel, comprising:

a tool connector and adaptor for coupling said robot arm to said end effector;

a frame connected to said tool connector and adaptor, said frame having one end connected to said tool connector and adaptor, and an opposite end cantilevered therefrom;

a shuttle mounted for lateral motion on said frame and having a lateral motion motor for moving said shuttle to a selected lateral position in said frame;

a vertical motion motor for imparting vertical motion to a first lug on said shuttle;

a first support plate supported horizontally on said shuttle and connected to said lug for movement in a vertical direction to a desired position under control of said vertical motion motor;

a drill mounted on said support plate, said drill having a drill motor for rotating a drill bit chucked in said drill, and a plunge mechanism for advancing and retracting said drill bit into and out of said workpiece and said panel for drilling a hole therein; and a clamp mounted on said frame in front of said drill for holding said workpiece in position to be drilled when said drill rotates and plunges said drill bit forward to drill said hole in said workpiece and said panel.

11. An end effector as defined in claim 10, further comprising:

an inserter mounted on said support plate adjacent to said drill for inserting temporary fasteners in said drilled hole in said workpiece and said panel for temporarily holding said workpiece on said panel.

12. An end effector as defined in claim 10, further comprising:

a second lug on said shuttle coupled to said vertical motion motor and movable under control of said vertical motion motor in a vertical direction opposite to the vertical direction of said first lug;

a second support plate supported horizontally on said shuttle and connected to said second lug for vertical motion to a desired position under control of said vertical motion motor.

13. An end effector as defined in claim 10, further comprising:

a pair of linear bearings for guiding and supporting said first support plate for self-parallel vertical motion, said linear bearings having horizontally spaced vertical tracks mounted on said shuttle and a pair of bearing blocks mounted on said support plate and engaged with said tracks.

14. An end effector as defined in claim 10, wherein said linear bearings include two horizontally spaced vertical tracks and a bearing block engaged with each track and fastened to said support plates.

15. An end effector for attachment to and manipulation by a robot arm for picking up a part, carrying and positioning the part accurately to a desired location against a panel, drilling at least one coordination hole through the part and the panel, and delivering the part to a receptacle, comprising:

a rigid frame having a vertically oriented back plate with front and back surfaces; a top U-shaped member having two side arms connected at inner ends thereof to said back plate and a front top cross member connected to outer ends of said side arms; a bottom U-shaped member having two lower side arms connected at inner ends thereof to said back plate and a front bottom cross member attached to an outer end of said two lower side arms; and two vertical members connecting said side arms of said top and bottom U-shaped members on each lateral side of said frame;

a tool adapter connected to said back surface of said back plate for attachment of said end effector to a robot arm;

a pair of vertically spaced horizontal linear bearings, including two vertically spaced horizontal tracks defining a vertical plane, and a pair of laterally spaced bearing blocks engaged with said tracks, said linear bearing being attached to a front surface of said vertical members of said frame;

a shuttle having a shuttle housing mounted for lateral movement on said horizontal linear bearings for horizontal movement parallel to said vertical plane;

a horizontal lead screw in said shuttle mounted on bearings therein for rotation about the longitudinal axis of said lead screw;

a first servomotor mounted on said shuttle housing and coupled to said horizontal lead screw for rotating said lead screw about the longitudinal axis thereof;

a first nut engaged with said lead screw and movable horizontally therealong when said lead screw rotates;

a first translation lug connected to said nut and projecting out of a slot in said shuttle housing and engaged with a receptacle fixed on said frame, such that said translation lug and said nut remain stationary when said lead screw rotates in said nut, thereby moving said lead screw and said shuttle body along said horizontal linear bearing by an amount equal to the pitch of said lead screw for each rotation thereof;

a pair of axially aligned lead screws of opposite hand to each other, coupled end-to-end on a vertical longitudinal axis, and mounted in said shuttle housing parallel to said vertical plane and orthogonal to said longitudinal axis of said horizontal lead screw;

a pair of axially aligned nuts threadedly engaged, one each on each of said axially aligned lead screws, and movable therealong vertically in opposite directions when said axially aligned lead screws are rotated about said vertical longitudinal axis;

a pair of translation lugs attached to said pair of nuts and projecting beyond said shuttle housing;

a pair of horizontally spaced vertical linear bearings having bearing rails connected to upright portions of said shuttle housing;

a pair of horizontally disposed, vertically spaced drill support plates, each having a pair of vertical hanger blocks connected thereto;

a bearing block attached to each of said hanger blocks, each bearing block engaged with a respective one of said bearing rails of said vertical linear bearings for supporting said drill support plates in said horizontal disposition;

a drill mounted on each of said drill support plates, each drill having a rotational axis about which it drives a drill bit held in a chuck on said drill and along which said drill plunges said drill bit when drilling a hole in a workpiece;

a clamp for grasping and holding a workpiece in line with said rotational axes of said drills;

whereby said robot can be manipulated to position said end effector over said workpiece and trigger said clamp to grasp said workpiece, and said robot can manipulate said end effector to carry said workpiece and place it against a panel at a precisely predetermined position, and said drills can be triggered to rotate and plunge said drill bits through said workpiece and said panel to provide coordination holes for accurate placement of said part on said panel.

16. An end effector as defined in claim 15, further comprising:

an air cylinder for operating said clamp, said air cylinder having a coupling for connection of an air line for delivering air under pressure to said air cylinder for operating said air cylinder to operate said clamp; and a solenoid air valve for controling flow of air under pressure to said air cylinder through said air line.

17. An end effector as defined in claim 15, further comprising:

a pair of linear encoders, each having a plungers contacting a contact, said encoders and said contacts being mounted on said end effector such that movement of said support plates is detected by movement of said plungers;

said encoders each having a conductor and generating a signal over said conductor that is read by said controller for controlling the position of said support plates.

* * * * *